United States Patent
Joy et al.

(10) Patent No.: US 6,820,150 B1
(45) Date of Patent: Nov. 16, 2004

(54) METHOD AND APPARATUS FOR PROVIDING QUALITY-OF-SERVICE DELIVERY FACILITIES OVER A BUS

(75) Inventors: Joseph M. Joy, Redmond, WA (US); Georgios Chrysanthakopoulos, Kirkland, WA (US); Rajesh Sundaram, Redmond, WA (US); Arvind Murching, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 09/829,880

(22) Filed: Apr. 11, 2001

(51) Int. Cl.⁷ ............................................. G06F 13/00
(52) U.S. Cl. ..................... 710/110; 710/107; 710/117; 370/395.43
(58) Field of Search ..................... 710/305; 370/395.61, 370/395.43, 401.466, 467; 709/227

(56) References Cited

U.S. PATENT DOCUMENTS

| | | | |
|---|---|---|---|
| 5,774,695 A | 6/1998 | Autrey et al. | |
| 5,845,152 A | 12/1998 | Anderson et al. | |
| 5,911,059 A | 6/1999 | Profit, Jr. | |
| 5,938,735 A | 8/1999 | Malik | |
| 5,953,511 A | 9/1999 | Sescila, III et al. | |
| 5,978,902 A | 11/1999 | Mann | |
| 5,991,520 A | 11/1999 | Smyers et al. | |
| 6,088,364 A | 7/2000 | Tokuhiro | |
| 6,094,530 A | 7/2000 | Brandewie | |
| 6,134,662 A | 10/2000 | Levy et al. | |
| 6,219,697 B1 | 4/2001 | Lawande et al. | |
| 6,266,729 B1 | 7/2001 | Leung et al. | |
| 6,272,581 B1 | 8/2001 | Leung et al. | |
| 6,279,123 B1 | 8/2001 | Mulrooney | |
| 6,347,337 B1 | 2/2002 | Shah | |
| 6,353,898 B1 | 3/2002 | Wipfel et al. | |

(List continued on next page.)

OTHER PUBLICATIONS

Arun Ayyagari et al., "IEEE 802.11 Quality of Service", white paper, Mar., 2000, 10 pages.

G. Hoffman et al., IEEE 1394: A Ubiquitous Bus, COMPCON '95, Mar. 5, 1995, p. 1–9, www.skipstone.com/comcon.html.

IEEE std 1394–1395, IEEE Standard for a High Performance Serial Bus, 1996, pp. 1–45.

(List continued on next page.)

*Primary Examiner*—Mark H. Rinehart
*Assistant Examiner*—Clifford Knoll
(74) *Attorney, Agent, or Firm*—Banner & Witcoff, Ltd.

(57) ABSTRACT

The invention provides quality-of-service (QoS) delivery services over a computer bus having isochronous data transfer capabilities. A transmitting node on the bus transmits a message to an intended recipient indicating a requested bandwidth for a connection. If the intended recipient has sufficient resources, it allocates an isochronous data channel on the bus and notifies the transmitter of the allocated channel. Thereafter, the transmitter transmits the data on the allocated channel. If the recipient cannot allocate a channel, it does not respond, and the transmitter thereafter detects a time-out condition and begins transmitting using a "best efforts" scheme (i.e., non-guaranteed time delivery). In a second variation, a receiving node detects that it is receiving large quantities of data from a transmitting node. In response, the receiving node allocates an isochronous data channel on the bus and notifies the transmitter of the allocated channel. Thereafter, the transmitter transmits using the allocated isochronous channel. In a third variation, multiple receiving nodes that need to receive streaming data from a single transmitting node share a common isochronous data channel. In any of these variations, each receiver can periodically transmit a "deadman" timer message on a broadcast channel to indicate that it is still receiving on a given channel. If a transmitter detects that the deadman timer has expired, it reverts to transmitting data using a "best-efforts" scheme. A transmitter can transmit both to receivers that can handle QoS services and those that cannot explicitly support QoS services.

19 Claims, 5 Drawing Sheets

U.S. PATENT DOCUMENTS

| | | | |
|---|---|---|---|
| 6,374,399 B1 | | 4/2002 | Mann |
| 6,378,000 B1 | | 4/2002 | Akatsu et al. |
| 6,430,635 B1 | * | 8/2002 | Kwon et al. ............... 710/104 |
| 6,434,117 B1 | * | 8/2002 | Momona .................... 370/236 |
| 6,496,509 B1 | | 12/2002 | Fant |
| 6,496,862 B1 | | 12/2002 | Akatsu et al. |
| 6,522,654 B1 | | 2/2003 | Small |
| 6,538,758 B1 | * | 3/2003 | Ikegawa .................... 358/1.13 |
| 6,600,756 B1 | * | 7/2003 | Haviland .................... 370/468 |
| 6,658,512 B1 | * | 12/2003 | Gokulrangan ............... 710/117 |
| 6,701,371 B1 | | 3/2004 | Lee |
| 6,725,311 B1 | | 4/2004 | Joy et al. |
| 2002/0133632 A1 | * | 9/2002 | Salloum Salazar .......... 709/253 |
| 2002/0141418 A1 | * | 10/2002 | Ben-Dor et al. ............ 370/398 |
| 2003/0078063 A1 | * | 4/2003 | Legallais et al. ........... 455/509 |
| 2003/0217220 A1 | * | 11/2003 | Lee et al. ................... 710/313 |

OTHER PUBLICATIONS

D. Plummer, "RFC 826: An Ethernet Address Resolution Protocol", http://cie.motor.ru/RFC/Orig/rfc826.txt, Nov. 1982, pp. 1–8.

J. Postel, et al., "RFC 1042: A Standard for the Transmission of IP Datagrams over IEEE 802 Networks", http://IEC,motor.ru/RFC/Orig/rfc1042.txt, Feb. 1988, pp. 1–14.

International Electrotechnical Commission, "Consumer audio/video equipment—Digital interface—Part 1: General", IEC First edition, Feb. 1998, Reference No. 61883–1, pp. 7–78.

International Electrotechnical Commission, "Consumer audio/video equipment—Digital interface—Part 2: SD–DVCR data transmission", IEC First edition, Feb. 1998, Reference No. 61883–2, pp. 5–15.

International Electrotechnical Commission, "Consumer audio/video equipment—Digital interface—Part 3: HD–DVCR data transmission", IEC First edition, Feb. 1998, Reference No. 61883–3, pp. 5–13.

International Electrochemical Commission, "Consumer audio/video equipment—Digital interface—Part 4: MPEG2–TS data transmission", IEC First edition, Feb. 1998, Reference No. 61883–4, pp. 5–23.

International Electrotechnical Commission, "Consumer audio/video equipment—Digital interface—Part 5: SDL–D–VCR data transmision", IEC First edition, Feb. 1998, Reference No. 61883–5, pp. 5–17.

International Electrotechnical Commission, "Consumer Audio/Video Equipment—Digital Interface—Part 6: Audio and music data transmission protocol", IEC Reference No. 61883–6/WD2, Nov. 1999, pp. 1–23.

MindShare, Inc., D. Anderson, "Fire Wire System Architecture IEEE 1394a Second Edition PC System Architecture Series", Dec. 1998, pp. 13–34.

"P1394.1 Draft Standard for High Performance Serial Bus Bridges", The Institute of Electrical and Electronics Engineers, Inc., Feb. 7, 1999, pp. 9–34.

Microsoft Corporation, "SBP–2 Support and Windows 2000", http://agent.microsoft.com/hwdev/print/sbp2_w2000.htm, Mar. 25, 1999.

Microsoft Corporation, "Windows 2000 Driver Development Kit Documentation", www.microsoft.com/hwdev/ddk/DDKdocs/Win2k/202mini_60yv.htm, Apr. 1999.

Microsoft Corporation, "Windows 2000 Driver Development Kit Documentation", http://www.microsoft.com/hwdev/ddk/DDKdocs/Win2k/102gen 9eg7.htm, et al., Apr. 1999.

Microsoft Corporation, "Windows 2000 Driver Development Kit Documentation", www.microsoft.com/hwdev/ddk/DDKdocs/Win2K/102gen 9ffr.htm, et al., Apr. 1999.

Microsoft Corporation, "NdisSendPackets", http://www.Microsoft.com/ddk/DDKdocs/Win2K/103ndisx 88s2.htm, Apr. 1999.

Microsoft Corporation, "NdisCICloseCall", http://www.microsoft.com/hwdev/ddk/DDKdocs/Win2K103ndisx 7rsi.htm, Apr. 1999.

Microsoft Corporation, "Windows 2000 Driver Development Kit Documentation", http://www.microsoft.com/ddk/ddkdocs/win2K/vdd 24px.htm, et al., Apr. 1999.

Cisco Systems Inc., "Quality of Service (Qos) Networking", http://www.cisco.com/univercd/cc/td/doc/cisintwk.ito doc/qos.htm, Jun. 1999.

Unibrain S.A., "Unibrain FireAPI™ Documentation 1394 Class Driver, Kernel Mode Interface", Jul. 1999, pp. 1–193.

Microsoft Corporation, "Quality of Service Technical White Paper", 1999.

IETF, T. Saito, et al., "'IP over iso1394' and 'AV over iso1394' controlled by an extension of MCAP", http://search.ietf.org/internet–drafts/draft–ietf–ip1394–ip–over–iso1394–00.txt, pp. 1–11, Sep. 1999.

Microsoft Corporation, "A Short Overview of QoS Mechanisms and Their Interoperation,", 1999, pp. 1–7.

Congruent Software, Inc., P. Johansson, "RFC 2734: Ipv4 over IEEE 1394", Dec. 1999.

D. Steinberg, et al., "An Empirical Analysis of the IEEE–1394 Serial bus Protocol", IEEE Jan. 2000, pp. 58–64.

Unibrain S.A., "Unibrain FireAPI™ Documentation, 1394 Class Driver, User Mode Interface", Apr. 4, 2000, pp. 1–281.

Unibrain, S.A., "The IEEE–1394 Development Toolkit for Windows NT 4.0/98/98SE", http://www.unibrain.com/products/ieee–1394fireapi.htm, Apr. 14,. 2000.

The Promoters of the 1394 Open HCI, "1394 Open Host Controller Interface Specification", Sep. 29, 1997, pp. 1–168.

* cited by examiner

METHOD AND APPARATUS FOR PROVIDING QUALITY-OF-SERVICE DELIVERY FACILITIES OVER A BUS

TECHNICAL FIELD

The present invention relates generally to providing network-type services over a bus, such as the IEEE-1394 serial bus. More particularly, the invention provides a method and apparatus for providing quality of service delivery facilities over such a bus.

BACKGROUND OF THE INVENTION

The well-known Transmission Control Protocol/Internet Protocol (TCP/IP) has been used for many years to transmit data between computers. With the advent of the Internet, increasing numbers of people are using TCP/IP to transmit video, audio, and other forms of digital information. Applications such as videoconferencing and remote downloading of music rely on TCP/IP to transmit large quantities of information by breaking it up into packets that are then routed through the Internet. Unfortunately, the Internet cannot guarantee delivery of the information within a specified time period. Because data packets can be routed through many different computers depending on network traffic conditions, some packets may be delayed, causing "jerky" audio or video data.

It is conventional to transmit Internet Protocol (IP) packets over local area networks (LANs) such as an Ethernet. In such a scheme, IP data packets are "encapsulated" in an Ethernet frame, transmitted over an Ethernet LAN, and "unwrapped" at the receiving node to restore the original IP packet. In such networks, even though the distance between computers is generally much shorter than the Internet, there is no way to guarantee delivery of a given data packet within a specified time period. If the local area network becomes temporarily congested due to network traffic, time-sensitive data such as video streams can be delayed for an indeterminate time period.

One scheme for mitigating the aforementioned problem requires that network users (e.g., application programs) request bandwidth from a "Subnet Manager," which acts as a central clearinghouse for bandwidth on the Ethernet. Each network user must register with and use the service to transmit data packets. If even one network user fails to register before making use of the network, the scheme can fail, since the one user can effectively make unfettered use of the bandwidth on the network. Existing application programs must typically be modified to conform to the new scheme. Moreover, because the physical bus topology is inherently non-deterministic (e.g., collisions can prevent a given packet from reaching its destination in a specified time period), packets can still arrive late, causing jitter and other effects.

Recently, a serial bus standard known as the IEEE 1394 bus has been developed. Implementations of this bus are based on the internationally adopted ISO/IEC 13213 (ANSI/IEE 1212) CSR Architecture Specification and the IEEE 1394-1995 Serial Bus Specification. A typical system conforming to the IEEE 1394 standard includes a plurality of nodes that are interconnected via point-to-point links, such as cables, that each connect a single node of the serial bus to another node of the serial bus. The nodes are addressable entities that can be independently reset and identified.

The 1394 bus provides both asynchronous and isochronous (time-guaranteed delivery) capabilities. Up to 64 isochronous channels are available on the bus. Nodes needing to send isochronous data must reserve bandwidth and a channel number on which to transmit. Bandwidth is measured as the percentage of a nominally 125-microsecond isochronous interval. Reservation of bandwidth and channel numbers is performed by manipulating registers on a well-known bus node, referred to as the isochronous resource manager (IRM).

The IEEE 1394 bus provides three primary types of bulk transfer:

(1) async-write (write to a specific address on a specific node). This is a point-to-point, best-effort, acknowledged service with no timeliness guarantees.

(2) async-stream (stream data on a specific channel). This is a multicast, best-effort, non-acknowledged service with no timeliness guarantees.

(3) isoch-stream (stream data on a specific channel with time guarantees). This is a multicast, isochronous (latency under 250 microseconds) non-acknowledged service that uses the same 64 channels available under async-stream.

Various implementations of the IEEE 1394 bus in computer systems typically include layered hardware and software support based on transaction, link, and physical layer protocols. The Internet Request for Comments (RFC) 2734, available at http://www.ietf.org/rfc/rfc2734.txt, describes a scheme for using the 1394 bus to transmit IP datagrams. The document generally describes a multicast channel allocation protocol (MCAP), which permits management of serial bus resources when used by IP multicast groups. However, it does not provide a generalized approach for providing quality-of-service facilities for applications using the bus.

Another document (http://search.ietf.org/internet-drafts-ietf-ip1394-ip-over-iso1394-00.txt) describes a proposal for using the isochronous channels on an IEEE 1394-compliant bus to guarantee bandwidth. The document generally suggests transmitting specific IP flows over a certain isochronous channel on the 1394 bus. However, it does not address various QoS requirements (e.g., point-to-point flows, such as a TCP connection), and does not support multicast.

Another document (IEC 61883-1) describes a protocol for the cooperative allocation and sharing of IEEE 1394 isochronous channels among audio/video devices. The protocol concerns itself purely with the reservation of channels and setting maximum transmission parameters for channels; it does not concern itself with the advertisement of the type of data transmitted over a particular channel.

Conventional approaches for allocating bandwidth to transmit data packets over a bus can incur various disadvantages, such as: (1) the possibility that bus resources can be locked up indefinitely if a resource requester crashes after allocation; (2) wasteful allocation where a transmitting node requests resources but the intended recipient is not available or able to use the resources; (3) an inability of applications that lack QoS capabilities to efficiently use bandwidth on the bus; and (4) no graceful degradation (i.e., failure to allocate isochronous facilities results in failure of communication, rather than degraded communication).

Consequently, there is a need to provide a decentralized quality-of-service facility that can be implemented over the IEEE 1394 bus, and that can adapt to changing conditions on the bus. Moreover, there is a need to provide quality-of-service features even for applications that do not directly support QoS services.

SUMMARY OF THE INVENTION

The invention permits applications, including those that support quality-of-service (QoS) features (e.g., videoconferencing), to take advantage of guaranteed delivery features of a computer bus such as the IEEE 1394 serial bus. In one embodiment, a transmitting node on a bus transmits a message to an intended recipient indicating a requested bandwidth for a connection. If the intended recipient has sufficient resources (e.g., a typical 1394 implementation limits each receiver to no more than 4 reception channels), it allocates an isochronous data channel on the bus and notifies the transmitter of the allocated channel. Thereafter, the transmitter transmits the data on the allocated channel. If the recipient cannot allocate a channel, it does not respond, and the transmitter thereafter detects a time-out condition and begins transmitting using a "best efforts" scheme (i.e., non-guaranteed time delivery).

In a second embodiment, a receiving node detects that it is receiving large quantities of data from a transmitting node on a broadcast channel. In response, the receiving node allocates an isochronous data channel on the 1394 bus and notifies the transmitter of the allocated channel. Thereafter, the transmitter transmits using the allocated isochronous channel.

In a third embodiment, multiple receiving nodes that need to receive streaming data from a in single transmitting node share a common isochronous data channel. In this embodiment, each receiver transmits a message to other potential recipients to determine whether any other recipient has already allocated an isochronous channel. If no other receiver has already allocated a channel, the first receiver allocates a channel and notifies other potential recipients of the allocated channel. (If another receiver had already allocated a channel, the second receiver receives the transmission on the already-allocated channel.) If the first receiver that allocated the channel no longer needs it, it keeps it allocated if any other receivers are listening to the channel and deallocates it when no other receivers are using it.

In any of the above embodiments, each receiver can periodically transmit a "keep alive" message on a broadcast channel that acts as a deadman timer to indicate that the receiver is still receiving on a given channel. If a transmitter detects that the deadman timer has expired, it reverts to transmitting data using a "best-efforts" scheme. Moreover, a transmitter can transmit both to receivers that can handle QoS services and those that cannot explicitly support QoS services.

DETAILED DESCRIPTION OF THE INVENTION

Figure 1:
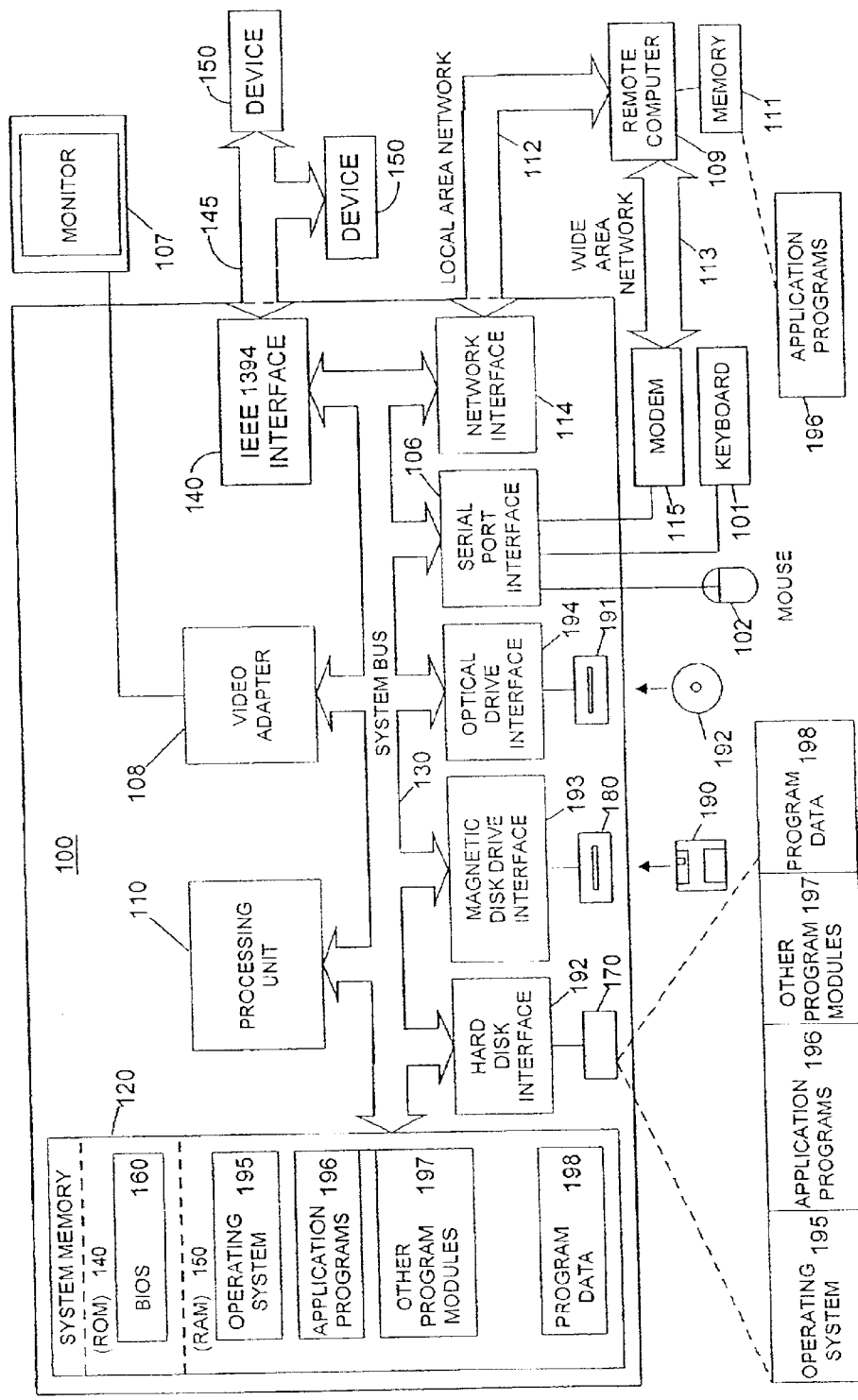
FIG. 1 is a schematic block diagram of a conventional general-purpose digital computing environment that can be used to implement various aspects of the present invention.

FIG. 1 is a schematic diagram of a conventional general-purpose digital-computing environment that can be used to implement various aspects of the present invention. A computer includes a processing unit 110, a system memory 120 and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for the computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. In particular, the RAM 150 will, from time to time, store various device drivers, as known in the art. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal a computers typically include other peripheral output devices (not shown), such as speakers and. An IEEE 1394 interface 140 may also be provided. The IEEE 1394 interface 140 couples an IEEE 1394 -compliant serial bus 145 to the system bus 130 or similar communication bus. The IEEE 1394-compliant serial bus 145, as known in the art, allows multiple devices 150 to communicate with the computer 100 and each other using high-speed serial channels. The IEEE 1394 serial bus standard is based largely upon the internationally adopted ISO/IEC 13213 (ANSI/IEEE 1212) CSR Architecture Specification and the IEEE 1394-1995 Serial Bus Specification. Additional buses such as the PCI bus can be provided in computer 100 and interfaced to the IEEE 1394 and other buses.

A typical serial bus having an IEEE 1394 standard architecture is comprised of a multiplicity of nodes that are interconnected via point-to-point links, such as cables, that each connect a single node of the serial bus to another node of the serial bus. The nodes themselves are addressable entities that can be independently reset and identified. Nodes are logical entities, each with a unique address. Each node provides a so-called configuration ROM (read-only memory)—hereinafter referred to as configuration memory—and a standardized set of control registers that can be accessed by software residing within the computer system.

The computer 100 can operate in a networked environment using logical connections to one or more remote computers, such as a remote computer 109. The remote computer 109 typically includes at least some of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to local network 112 through a network interface or adapter 114. When used in a WAN networking environment, the computer 100 and remote computer 109 may both include a modem 115 or other means for establishing a communications over wide area network 113, such as the Internet. The modem 115, which may be internal or external, is connected to system bus 130 via the serial port interface 106. In a networked environment, program modules depicted relative to the computer 100, or portions thereof, may be stored in the remote memory storage device.

It will be appreciated that the network connections shown are exemplary and other means of At establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server. Procedures of the present invention to be described below can operate within the environment of the computer 100 shown in FIG. 1. Although the invention is generally applicable to a computer operating in accordance with the IEEE 1394 standard, it is not intended to be so limited.

Figure 2:
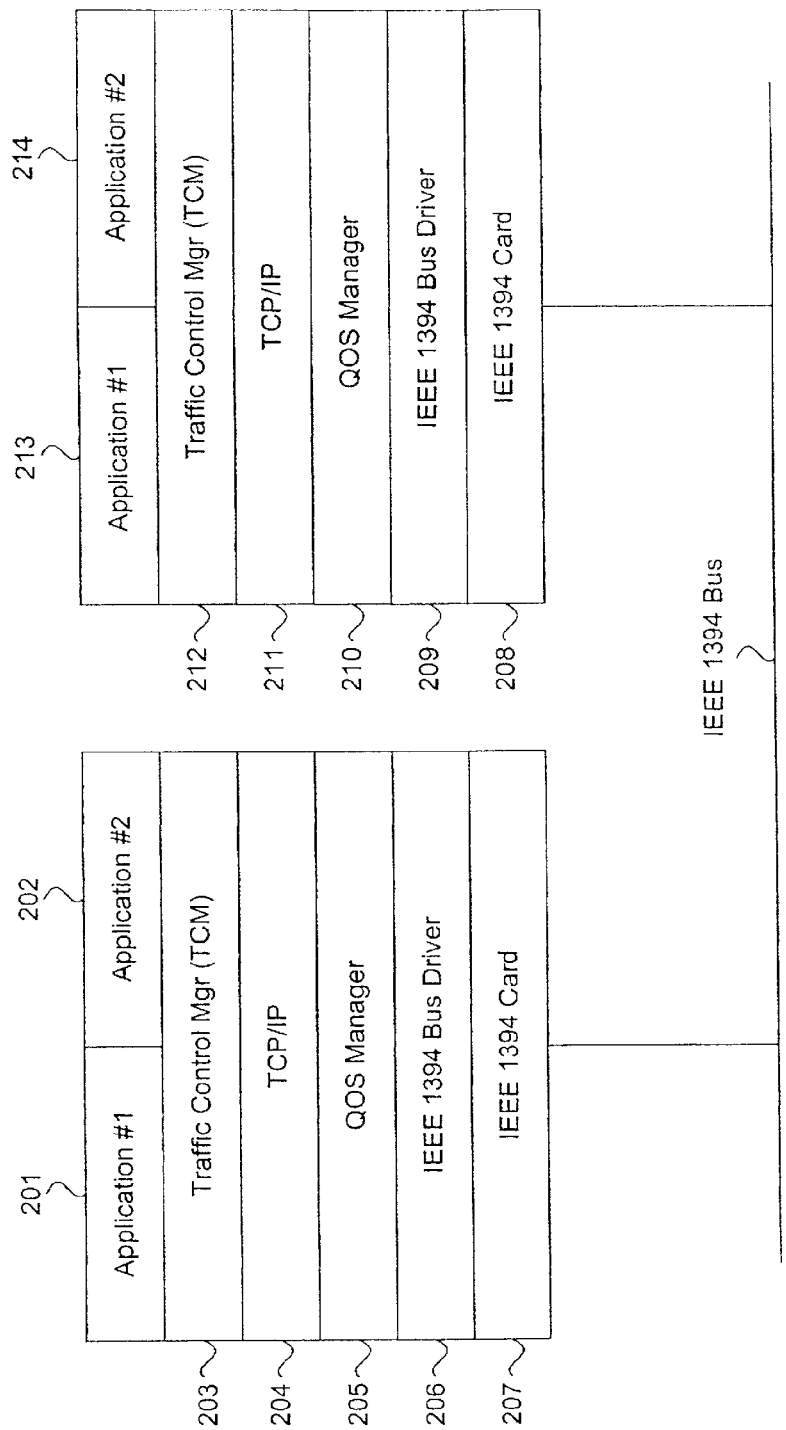
FIG. 2 shows a system employing a quality-of-service manager (205 and 210) in each of a plurality of nodes coupled over an IEEE 1394 bus.

FIG. 2 shows a system employing a quality-of-service manager (205 and 210) in each of a plurality of nodes coupled over an IEEE 1394 bus according to one aspect of the present invention. As shown in FIG. 2, two computer nodes 250 and 260 are coupled through a bus such as the IEEE 1394 bus. As is conventional, each node includes a 1394 hardware card (207 and 208, respectively) and an appropriate 1394 bus driver (206 and 209, respectively) that collectively permit the nodes to communicate using the 1394 bus.

In one embodiment, each 1394-compliant bus driver comprises an Open Host Controller Interface (OHCI) driver implementation of the IEEE 1394 link layer protocol. The OHCI is described in the 1394 Open Host Controller Interface Specification, which is widely available and well known to those of skill in the art. This interface can transmit and receive all defined 1394 packet formats using Direct Memory Access (DMA) to write the packets into the host computer's memory. In various embodiments, virtual device drivers can be used to connect to and communicate over the bus.

As is conventional, each node includes one or more application programs (201, 202, 213, and 214, respectively) that operate using TCP/IP protocols 204 and 211. Each application program may comprise, for example, a program that transmits audio and/or video data between nodes. As one example, one application program may comprise a videoconferencing application that permits two persons to see and hear each other by transmitting audio and video packets over the bus. In this case, it may be important or desirable to provide time-guaranteed delivery of data packets to prevent "jerky" audio and video displays at each node. Certain videoconferencing applications may be "QoS-enabled" in that they are aware of bandwidth allocation procedures and can issue commands to so allocate bandwidth in the network. Other applications may not have such features. In one embodiment, the present invention can also accommodate the latter type of applications without requiring software modifications to the applications.

For applications that are "QoS-enabled" (i.e., they include functionality that makes direct use of quality-of-service features such as bandwidth allocation), a traffic control manager (TCM) component 203 and 212 traps QoS calls and routes them to the appropriate functions in the lower levels of software, as described in more detail herein. Data packets are transmitted using TCP/IP protocols 204 and 211, as is conventional. Various features of the present invention can be incorporated into QoS managers 205 and 210, as described in more detail below. It may be desirable to abstract out or translate different types of QoS requests (including conventional ones such as RSVP) into 1394-specific allocation requests. Although it is contemplated that the inventive principles can be implemented using the architecture of FIG. 2, other approaches are of course possible and the invention is not intended to be limited in this respect.

Figure 3:
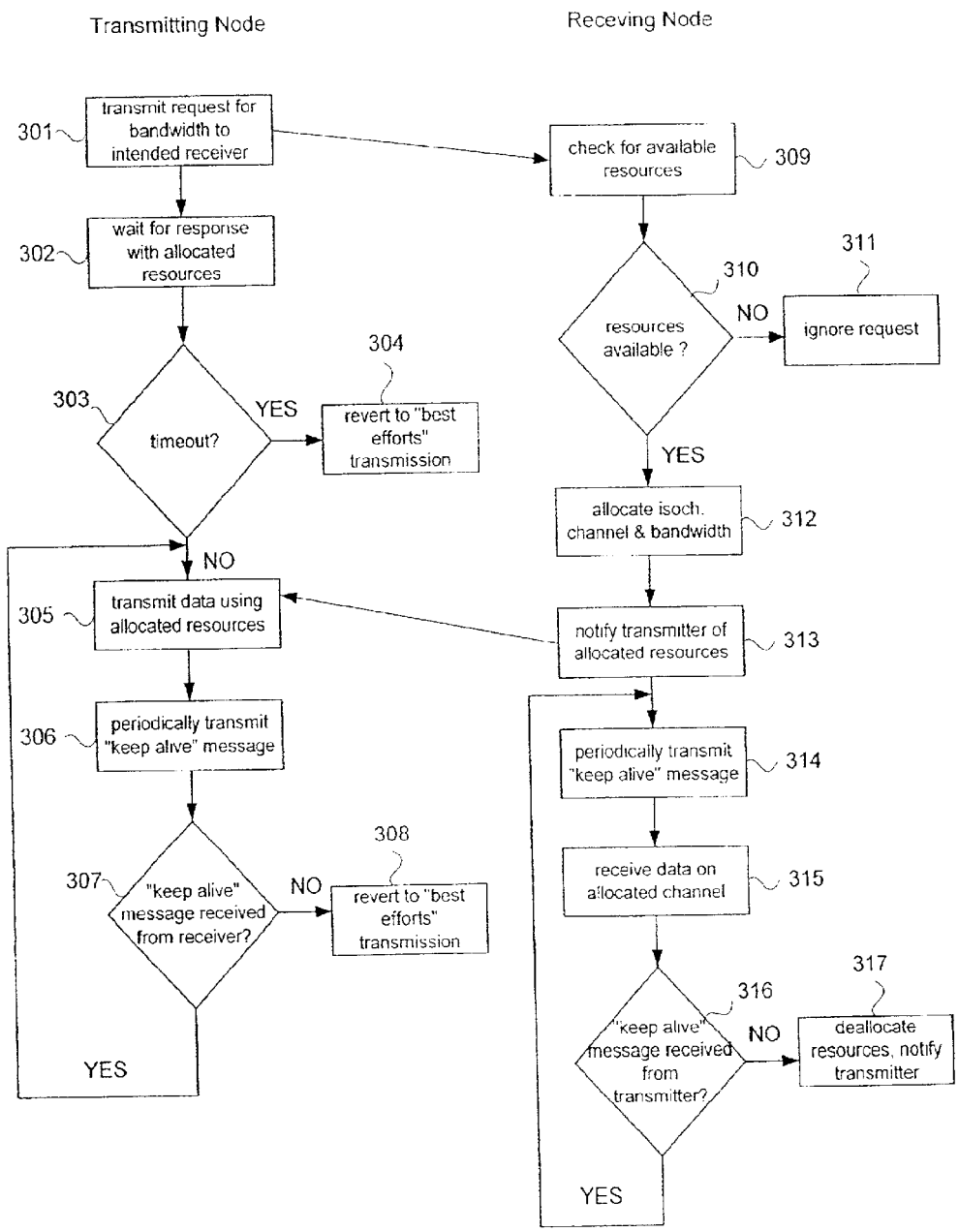
FIG. 3 shows method steps for allocating bandwidth in a system between a transmitting node and a receiving node according to one variation of the invention.

FIG. 3 shows method steps for allocating bandwidth in a system between a transmitting node and a receiving node according to one variation of the invention. It is assumed in FIG. 3 that a QoS-enabled application on a first node seeks to communicate with a QoS-enabled application on a second node over the IEEE 1394 bus. Steps performed by the transmitting node are shown on the left side of FIG. 3, while those performed by the receiving node are shown on the right side of FIG. 3. It will be appreciated that for a two-way transmission (e.g., full-duplex videoconferencing), each node will effectively act as both a transmitter and a receiver, and thus the steps shown can be replicated on opposite nodes. In one embodiment, the steps shown in FIG. 3 are performed by QoS managers 205 and 210 of FIG. 2. The inventive steps, however, can be practiced in various other ways, and the invention is not limited to the structures shown in FIG. 2.

Beginning in step 301, in response to receiving a request to transmit data at a given data rate (e.g., a known rate sufficient to support good-quality video frames), the transmitting node transmits a request for bandwidth to the intended receiving node. The request can include related information such as the source IP address, port number, protocol, and destination IP address. In one embodiment, a flow descriptor can be used to reference information pertaining to each flow and to allow an application to advertise what it is providing and what it needs. For example, a flow descriptor may comprise fields such as TCP/IP flow information (source IP address, source port, destination IP address, and destination port) and, optionally, a data format (e.g., MPEG, audio, etc.) This transmission can occur over a broadcast channel that is used to communicate among the nodes for purposes of resource allocation.

In step 309, the receiving node checks to determine whether resources (e.g., an isochronous channel and suitable bandwidth) are available. For example, in certain systems the IEEE 1394 bus may be configured to permit each node to allocate a maximum number (e.g., four) of isochronous data channels. If the intended recipient node had already allocated this maximum number of channels, then no further resources would be available for allocation.

In step 310, a check is made in the intended receiver to determine whether resources are available for the communication. If not, then in step 311 the request is ignored, and processing terminates. (If the receiving node does not support QoS services, the request will also be ignored or rejected, leading to the same or similar result). Ignoring the request will cause the transmitter to time-out, as described in more detail below.

In step 312, if resources are available, the receiver allocates an isochronous data channel with desired bandwidth. In one embodiment, these resources are allocated using conventional IEEE 1394-specific function calls.

In step 313, the receiving node transmits a message on the broadcast channel to the transmitting node indicating the allocated channel number and bandwidth. Thereafter, the receiving node periodically transmits a "keep alive" message in step 314 to the transmitting node indicating that the resources are still allocated. In step 315, the receiver receives data from the transmitter over the allocated isochronous data channel. In step 316, the receiver checks to determine whether the transmitting node has transmitted a similar periodic "keep alive" message. If such a message is received, then processing continues in step 314 until such messages are no longer received. If no such "keep alive" message is received within a time-out period, then in step 317 the resources are deallocated, and the transmitter is optionally notified of the deallocation.

The "keep alive" timer scheme described above allows for system resources to be automatically deallocated in the event that one of the nodes (e.g., the transmitter or receiver) fails, thus preventing resource lock-up.

Returning to the left side of FIG. 3, if in step 303 no response is received from the intended recipient within a timeout period, then in step 304 communication will revert to a "best efforts" transmission scheme, which does not require allocation of bus resources. For example, the transmitting node can transmit the data packets using asynchronous writes over the 1394 bus. Alternatively, the transmitting node can transmit the data packets using asynchronous streams on a specific data channel. The latter scheme provides non-acknowledged service with no timeliness guarantees. This default to a best-efforts transmission mode provides a degraded communication mode that permits the nodes to communicate even if bus resources are not available, rather than returning an error message to the application program.

In step 303, assuming that a response was received from the intended receiver (i.e., no time-out), then in step 305 the transmitter begins transmitting data using the allocated resources (e.g., using the allocated channel and bandwidth parameters). In step 306, the transmitter periodically transmits a "keep alive" message to the receiver in order to signal that the allocated channel is still in use. If in step 307 the transmitter determines that a similar "keep alive" message has not been received from the receiver within a certain time-out period, then in step 308 communication reverts to a "best efforts" transmission mode as described above. In one variation, the transmitter can attempt to later reestablish guaranteed delivery communication with the intended receiver after a time-out period. Assuming that the receiver and transmitter continue to transmit "keep alive" messages for the resources, the transmitter transmits data using the allocated resources.

One advantage to the above-described scheme is that a QoS-enabled application can communicate with a non-QoS enabled application over the bus. For example, if a QoS-enabled transmitting node attempts to allocate bus resources to transmit streaming video packets, but the corresponding application at the receiving node is not QoS-enabled, then the transmission can automatically proceed in a degraded mode using best efforts communication. This is advantageous over a scheme that would otherwise not allow incompatible transmitting and receiving nodes to communicate.

Figure 4:
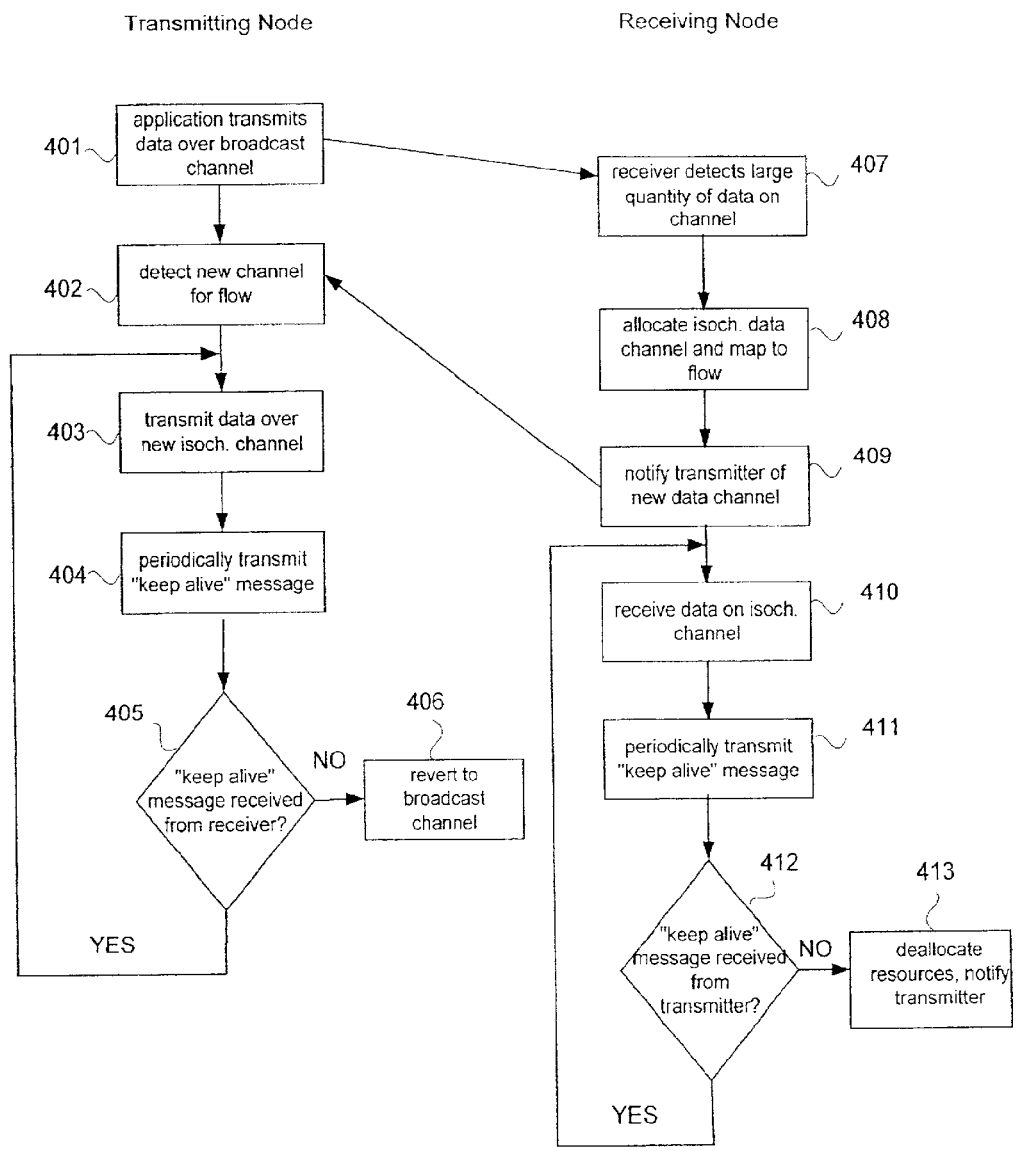
FIG. 4 shows method steps for allocating bandwidth in a system between a transmitting node and a receiving node according to a second variation of the invention.

FIG. 4 shows method steps for allocating bandwidth in a system between a transmitting node and a receiving node according to a second variation of the invention. In contrast to the scheme shown in FIG. 3, where it is assumed that the transmitting node is QoS-enabled (i.e., it makes an explicit request to allocate bus resources), the embodiment of FIG. 4 works even where the transmitting application is not QoS-enabled. In this embodiment, a high traffic condition is automatically detected between the nodes, and an isochronous data channel is automatically allocated and used to transfer further data packets between the nodes. As with the embodiment of FIG. 3, the steps in FIG. 4 can be carried out in QoS manager 205 and 210 of FIG. 2, preferably in a data link a layer of a protocol stack.

Beginning in step 401, an application program begins transmitting data packets over the bus, such as over a broadcast channel or over an asynchronous data channel. In step 407, the receiving node begins receiving the data packets and determines that a large number of packets are continually being received from the transmitting node. (This can be further refined to detect not only traffic from a particular node, but traffic occurring over a specific IP flow, such as from a particular IP address). In response to this determination, the receiver in step 408 allocates an isochronous data channel on the bus with sufficient bandwidth to support the expected data packets, and maps the data channel to the particular flow (e.g., the IP addresses from which the packets are being received). In step 409, the receiving node notifies the transmitting node of the newly allocated isochronous data channel. Steps 410 through 413 are similar to steps 314 through 317 of FIG. 3 and no further elaboration is required.

Returning to the transmitting side of FIG. 4, in step 402 the transmitting node detects the assignment of a new data channel for the designated flow, and in step 403 changes its transmission mode to begin transmitting the packets associated with the flow over the newly allocated isochronous data channel. In step 404, the transmitter periodically transmits a "keep alive" message to the receiver to signal that the resources are being used. In step 405, the transmitter determines whether a similar periodic "keep alive" message has been received from the receiver and, if not, reverts to the broadcast channel mode of communication in step 406.

As explained above, one advantage of the method shown in FIG. 4 is that time-bounded data transmission can be used even where application programs are not QoS-enabled. That is, the isochronous data channels can be used efficiently in the system even where application programs are not knowledgeable about such channels.

Figure 5:
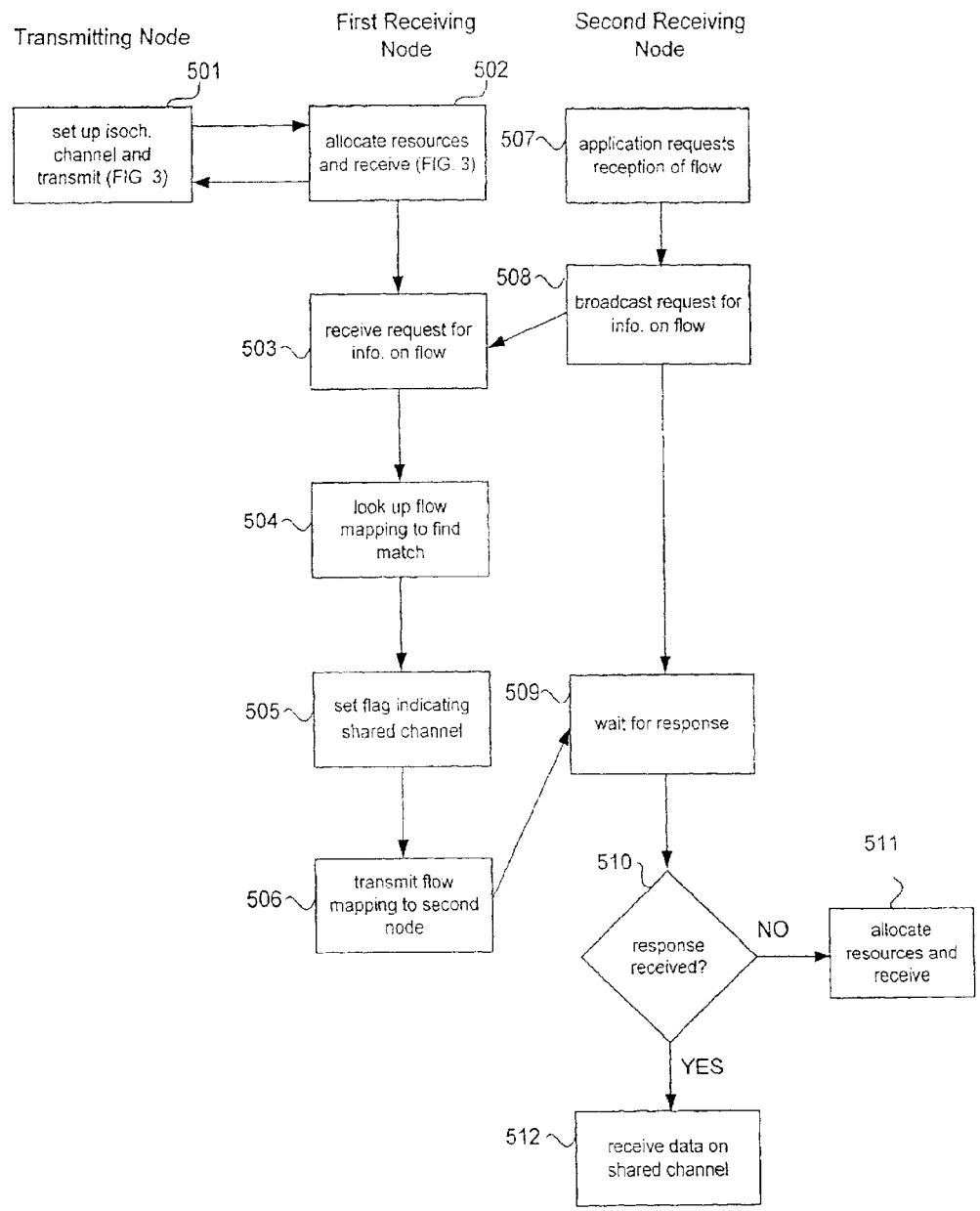
FIG. 5 shows method steps for allocating bandwidth in a system between a transmitting node and a plurality of receiving nodes according to a third variation of the invention.

FIG. 5 shows method steps for allocating bandwidth in a system between a transmitting node and a plurality of receiving nodes according to a third variation of the invention. In the embodiment of FIG. 5, it is assumed that a single transmitter transmits data packets, and two different receiving nodes seek to receive the same data stream from the transmitter. As one example, a video broadcast (e.g., a TV program) is to be transmitted from a central node, and multiple recipient nodes seek to receive the same broadcast.

Steps 501 and 502, shown in abbreviated form in FIG. 5, are assumed to encompass steps such as those shown in FIG. 3 or FIG. 4. In other words, the transmitting node and the first receiving node set up an isochronous communication channel using techniques such as those illustrated in HG. or FIG. 4.

In step 507, it is assumed that an application program in a second receiving node seeks to receive the same packets transmitted from the transmitting node. If a TV program is being transmitted using a known IP address, for example, the second receiving node can determine that such a broadcast is currently being transmitted over the bus.

In step 508, the second receiving node broadcasts a request over the bus for information regarding the flow corresponding to the transmitted packets. This request is received by the first receiver which, in step 504, checks its internal allocation tables to find the corresponding channel information for the flow. In step 505, the first receiving node sets a flag indicating that the channel is now being shared by a second node, and in step 506 transmits the flow mapping information (e.g., the channel and bandwidth information corresponding to the requested flow) to the second receiving node.

In step 509, the second receiving node waits for a response to the request for information. In step 510, if no response is received within a time-out period, then in step 511 it is assumed that no other node has allocated resources for the flow, and the node proceeds to allocate resources and receive the transmission over the allocated resource. Alternatively, if a response was received from the first receiving node, then in step 512 the second receiving node begins receiving data on the shared channel.

In one embodiment, the first receiving node sets a flag indicating that the channel is shared (see step 505) in order to prevent the de-allocation of the resource if another node is using the shared channel. For example, if the user at the first receiving node terminates viewing of a video program, first receiving node should first check to see whether any other nodes are sharing the channel before deallocating the resources. If another node continues to share the channel, the first receiving node can continue to leave the resources allocated until either receiving a termination request from the other node(s), or until a "keep alive" message (not shown) is no longer received from the second node.

Thus has been described a system and various methods for implementing quality-of-service facilities such as guaranteed time delivery of data packets in a system, even for application programs that are not QoS-enabled. The system and methods can be used in any number of applications such as videoconferencing, music downloading, Internet browsing, and the like. The inventive principles can be practiced without requiring a central resource flow allocation manager, thus providing a fail-safe and robust system.

What has been described above is merely illustrative of the application of the principles of the present invention.

Other arrangements and methods can be implemented by those skilled in the art without departing from the spirit and scope of the present invention. Any of the methods of the invention can be implemented in software that can be stored on computer disks or other computer-readable media for execution in a host or target computer. While an electrical medium has been described as the communications channel, the principles can also be applied using RF, fiber optic, or other media. No claim should be interpreted to be in means plus function format. Numbered steps in method claims should not be interpreted to require a particular ordering of the steps.

What is claimed is:

1. A method of delivering data packets over a bus that supports both isochronous and asynchronous modes of data transmission, comprising the steps of:

(1) at a transmitting node, translating a bus-generic request for a quality-of-service connection into a bus-specific request for time-guaranteed delivery services;

(2) from the transmitting node, transmitting the bus-specific request to an intended receiving node on the bus;

(3) at the intended receiving node, checking to determine whether sufficient resources are available to allocate an isochronous data channel on the bus and, in response to such availability, allocating the isochronous data channel;

(4) notifying the transmitting node of the allocated isochronous data channel;

(5) from the transmitting node, transmitting data packets to the intended receiving node using the allocated isochronous data channel; and (6) setting a timer in the transmitting node and, in response to detecting a time-out condition based on the request transmitted in step (2), transmitting the data packets to the intended receiving node using the asynchronous delivery mode.

2. The method of claim 1, wherein the asynchronous delivery mode comprises transmitting the data packets using an asynchronous streaming delivery mode.

3. The method of claim 1, wherein the asynchronous delivery mode comprises transmitting the data packets using an asynchronous write operation mode.

4. A method of delivering data packets over a bus that supports both isochronous and asynchronous modes of data transmission, comprising the steps of:

(1) at a transmitting node, translating a bus-generic request for a quality-of-service connection into a bus-specific request for time-guaranteed delivery services;

(2) from the transmitting node, transmitting the bus-specific request to an intended receiving node on the bus;

(3) at the intended receiving node, checking to determine whether sufficient resources are available to allocate an isochronous data channel on the bus and, in response to such availability, allocating the isochronous data channel;

(4) notifying the transmitting node of the allocated isochronous data channel;

(5) from the transmitting node, transmitting data packets to the intended receiving node using the allocated isochronous data channel;

(6) periodically transmitting from the intended receiving node a "keep alive" message indicating that resources have been allocated; and (7) in the transmitting node, monitoring the "keep alive" message periodically transmitted from the intended receiving node and, in response to detecting that the "keep alive" message is no longer being transmitted, reverting to a mode wherein the data packets are transmitted to the intended receiving node using the asynchronous delivery mode.

5. The method of claim 1, further comprising the steps of:

(7) periodically transmitting from the transmitting node to the intended receiving node a "keep alive" message indicating that the transmission is continuing;

(8) in the intended receiving node, monitoring the "keep alive" message periodically transmitted by the transmitting node and, in response to detecting that the "keep alive" message is no longer being periodically transmitted, deallocating the bus resources.

6. The method of claim 2, wherein steps (1) through (5) are performed in computer nodes that are coupled to an IEEE-1394 serial bus.

7. The method of claim 1, wherein step (2) is performed in response to a quality-of-service request made by an application program executing in the transmitting node.

8. A computer-readable medium comprising computer instructions which, when executed by a transmitting node coupled to a computer bus that provides both isochronous and asynchronous data delivery facilities, performs the steps of:

(1) translating a bus-generic request for a quality-of-service connection into a bus-specific request for time-guaranteed delivery services;

(2) transmitting the bus-specific request to an intended receiving node on the computer bus;

(3) in response to receiving a message from the intended receiving node indicating that an isochronous data channel on the computer bus has been allocated, transmitting a plurality of data packets over the allocated isochronous data channel; and (4) setting a timer in the transmitting node and, in response to detecting a time-out condition based on the request transmitted in step (2), transmitting the data packets to the intended receiving node using the asynchronous delivery mode.

9. The computer-readable medium of claim 8, wherein the asynchronous delivery mode comprises transmitting the data packets using an asynchronous streaming delivery mode.

10. The computer-readable medium of claim 8, wherein the asynchronous delivery mode comprises transmitting the data packets using an asynchronous write operation mode.

11. A computer-readable medium comprising computer instructions which, when executed by a transmitting node coupled to a computer bus that provides both isochronous and asynchronous data delivery facilities, performs the steps of:

(1) translating a bus-generic request for a quality-of-service connection into a bus-specific request for time-guaranteed delivery services;

(2) transmitting the bus-specific request to an intended receiving node on the computer bus;

(3) in response to receiving a message from the intended receiving node indicating that an isochronous data channel on the computer bus has been allocated, transmitting a plurality of data packets over the allocated isochronous data channel; and (4) monitoring a "keep alive" message periodically transmitted from the intended receiving node and, in response to detecting that the "keep alive" message is no longer being transmitted, reverting to a mode wherein the data packets are transmitted to the intended receiving node using the asynchronous delivery mode.

12. The computer-readable medium of claim 8, wherein the computer instructions further comprise instructions that perform the step of periodically transmitting from the transmitting node to the intended receiving node a "keep alive" message indicating that the transmission is continuing.

13. A method of delivering data packets over a bus that supports both isochronous and asynchronous modes of data transmission, comprising the steps of:

(1) from a transmitting node, transmitting data packets to an intended receiving node using the asynchronous mode of data transmission;

(2) in the intended receiving node, detecting that data packets are repeatedly received from the transmitting node and, in response thereto, allocating an isochronous data channel on the bus;

(3) notifying the transmitting node of the allocated isochronous data channel;

(4) from the transmitting node, transmitting the data packets to the intended receiving node using the allocated isochronous data channel;

(5) periodically transmitting from the intended receiving node a "keep alive" message indicating that resources have been allocated; and (6) in the transmitting node, monitoring the "keep alive" message periodically transmitted by the intended receiving node and, in response to detecting that the "keep alive" message is no longer being transmitted, reverting to a mode wherein the data packets are transmitted to the intended receiving node using the asynchronous delivery mode.

14. The method of claim 13, further comprising the steps of:

(7) periodically transmitting from the transmitting node to the intended receiving node a "keep alive" message indicating that the transmission is continuing; and (8) in the intended receiving node, monitoring the "keep alive" message periodically transmitted by the transmitting node and, in response to detecting that the "keep alive" message is no longer being periodically transmitted, deallocating the bus resources.

15. The method of claim 13, wherein step (2) comprises the step of detecting that a high traffic condition exists for data packets having a common IP address.

16. A computer-readable medium comprising computer instructions which, when executed by a receiving node coupled to a computer bus that provides both isochronous and asynchronous data delivery facilities, performs the steps of:

(1) detecting that data packets are repeatedly received from a transmitting node using the asynchronous data delivery facilities of the computer bus and, in response thereto, allocating an isochronous data channel on the bus;

(2) notifying the transmitting node of the allocated isochronous data channel;

(3) receiving data packets from the transmitting node over the allocated isochronous data channel; and (4) monitoring a "keep alive" message periodically transmitted from the intended receiving node and, in response to detecting that the "keep alive" message is no longer being periodically transmitted, reverting to a mode wherein the data packets are transmitted to the intended receiving node using the asynchronous delivery mode.

17. The computer-readable medium of claim 16, wherein the computer instructions comprise instructions that implement step (2) by detecting that a high traffic condition exists for data packets having a common IP address.

18. The method of claim 14, wherein step (2) comprises the step of detecting that a high traffic condition exists for data packets having a common IP address.

19. The computer-readable medium of claim 16, wherein the computer instructions further comprise instructions that perform the step of:

(5) monitoring a "keep alive" message periodically transmitted by the transmitting node and, in response to detecting that the "keep alive" message is no longer being periodically transmitted, deallocating the bus resources.

* * * * *